Patented Nov. 28, 1944

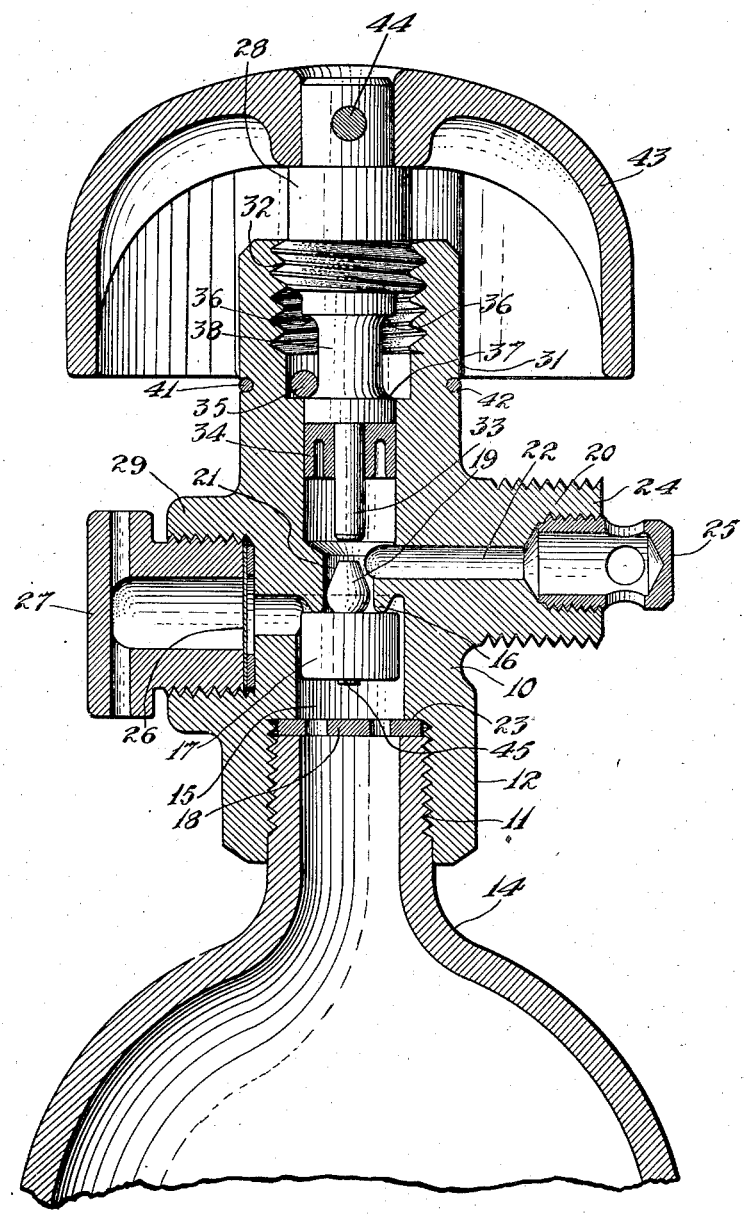

2,363,521

UNITED STATES PATENT OFFICE 2,363,521

VALVE DEVICE

Harry C. Grant, Jr., New York, N. Y., assignor to Specialties Development Corporation, Bloomfield, N. J., a corporation of New Jersey Application September 25, 1942, Serial No. 459,627

10 Claims. (Cl. 251—140)

The present invention relates to valves, and more particularly to valves for the control of high pressure fluid media, such as carbon dioxide stored in containers under high pressure in liquefied form.

When dealing with the storage of high pressure gaseous media, such as carbon dioxide, the problem of loss of the medium by leakage past the valve is a considerable one. Very tight closing of the valve is ordinarily required to prevent such leakage, and consequently, great force is usually necessary to open the valve in order to release the gas.

It is, accordingly, an object of the present invention to provide such a valve device which will not permit fluid pressure medium to escape by leakage.

Another object is to provide a valve device wherein the valve is seated with a force which is proportional to the pressure of the fluid medium controlled thereby.

Another object is to provide a valve device which may be opened by the application of a very small effort regardless of the sealing force.

Another object is to provide a valve device which is self-closing by pressure upon removal of the unseating force.

Another object is to provide a valve device which permits easy recharging of the storage container with which it is associated without dismantling or any extra parts.

A further object is to provide a valve device for high pressure gaseous fluid media of an improved and simplified construction and operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein:

The figure is a vertical sectional view of a portion of a storage container and a valve device attached to the container, illustrating an embodiment of the invention.

The device comprises a valve body 10 attached by means of threads 11 in an inlet portion 12 to the outside of the neck of a cylinder 14 for containing a fluid pressure medium. The valve body is provided with a valve chamber 15, an annular downwardly facing valve seat 16 above the inlet portion, a valve member 17 adapted to be forced upwardly against its seat 16 by the pressure medium in the container, a perforated or apertured disc 18 for preventing the valve member from dropping into the cylinder, and a discharge outlet 20 in communication with the valve chamber above the seat 16 through passages 21 and 22.

The valve member 17 is provided with a centrally and axially extending stem portion or member 19, which, by coaction with the walls of the passage 21, serves to guide the valve, as it is being unseated and reseated, and which is adapted to be engaged by an operating member to unseat the valve member, as will appear from the description which follows.

The disc 18 is disposed between a shoulder 23 of the inlet portion 12 and the upper edge of the cylinder 14, and may be composed of any material ordinarily employed for sealing or packing high pressure fluid devices, whereby it is effective as a seal between the valve body and the cylinder.

The discharge outlet 20 is adapted to receive a suitable hose, or the like (not shown), which may be secured to a threaded nipple portion 24 thereof by a hose coupling, or the like (not shown). The discharge outlet may be provided with a suitable anti-recoil plug 25 adapted to be threaded into the bore of the nipple portion 24.

The valve body 10 further may be provided with a safety discharge and recoil preventing outlet 29 in communication with the chamber 15 below the seat 16, for releasing the pressure medium to the atmosphere in the event the pressure within the cylinder exceeds a safe working pressure. The outlet 29 is normally closed by a frangible safety disc 26, which is held in place by a safety discharge plug 27.

A spindle 28 is threaded for rotation and quick upward and downward movement in the upper recessed portion 31 of the valve body at 32, and has a shank or pin portion 33 extending into the valve body for unseating the valve member 17. Preferably, the pin portion 33 extends through a U-sectioned sealing gasket or washer 34 disposed in the recessed portion 31. The quick lead thread, illustrated at 32 is left-handed, whereupon a relatively slight counterclockwise rotation of the spindle, the shank or pin portion 33 is moved downwardly to urge the valve member 17 off its seat to release the pressure medium from the cylinder through the discharge outlet 20.

The travel or stroke of the spindle 28, both upwardly and downwardly, may be controlled by the provision of a pin 35 which extends through the walls and the recess of the portion 31 and is adapted to engage an upper shoulder 36 and a lower shoulder 37 formed by a reduced intermediate portion 38 on the spindle. The pin 35 may be held in place by a split ring retainer 41 disposed in a suitable groove 42 on the outside of the portion 31.

The upper end of the spindle 28 extends outwardly of the valve body, and is provided with a manually operable member, such as a handwheel 43, or the like, held secured to the spindle by a pin 44.

The handwheel may be held locked with respect to the valve body to prevent unauthorized operation thereof by the provision of any one of the many known means (not shown) between the handwheel and the valve body.

From the foregoing description, it will be readily apparent that when it is desired to release the fluid medium, the valve device may be operated from the position as illustrated in the drawing, by rotating the handwheel 43 in a counterclockwise direction, whereupon through the action of the quick lead threads 32, a fraction of a turn of the wheel will bring the pin portion 33 into operative contact with the member stem portion 19 of the valve member 17. Only a very slight and short application of force is necessary to open the valve device against the seating force of the fluid medium in the container 14, as only a small opening or "cracking" of the seal is required in order to permit of a complete and effortless unseating of the valve member. This is due to the balancing of the load on the valve member by the fluid pressure now able to act on both sides thereof.

The fluid medium is now enabled to escape to the outlet 20 through passages 21 and 22. The downward stroke or travel of the spindle 28 is arrested as the upper shoulder 36 engages the pin 35. If it is desired to interrupt the escape of the fluid, the rotation of the handwheel in the clockwise direction permits the pressure of the fluid medium in the container to reseat the valve member 17 and to reestablish a permanent and gas tight seal.

During the downward travel of the spindle, the gasket or packing 34 is moved therewith, while, upon the spindle being moved upward, the gasket remains stationary, fluid pressure being necessary to return it to its uppermost position with respect to the pin 33. It is to be understood that this is a preferred construction, and modifications thereof are within the scope of the invention.

When the fluid medium in the container has escaped completely, the valve member 17 will be retained in the valve chamber by the apertured disc 18. A small projection 45 on the nether side of the valve member 17 enables it to rest on the disc 18 without closing the apertures therein, so that when refilling of the container is desired fluid medium is able to enter through the outlet, passages 22 and 21, through the valve chamber and past the valve member 17, and through the apertures in the disc 18 into the container. The gasket 34, in this instance, too, will prevent the escape of any fluid medium from the valve chamber past the spindle. As soon as the recharging pressure in the outlet passages drops sufficiently, the pressure of the fluid medium in the container acts to reseat the valve member, the dimensions of the valve chamber, the valve member, and the stem portion 19 being such that the valve member is guided readily and accurately back to its seat.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention which, as a matter of language, might be said to fall therebetween.

I claim:

1. For use with the neck portion of a fluid pressure medium container, a valve device for controlling the release of high pressure fluid media, comprising a valve body having an inlet passage having a recess adapted for securement to a container, an outlet passage, and a valve chamber within said inlet passage; a valve seat facing said valve chamber and formed in said outlet passage; a seat type check valve reciprocally movable in said valve chamber adapted to seat in the direction of the escaping fluid pressure medium; an apertured sealing washer in said recess of the inlet passage adapted to be engaged by the neck portion and to seal therewith and adapted to retain said valve in said valve chamber; a recessed portion on said valve body; a member for unseating said check valve threadedly mounted for reciprocal movement in said recessed portion extending outside said valve body and having a pin portion for operatively engaging said check valve but normally out of contact therewith; and a manually engageable operating member secured to said unseating member.

2. For use with a fluid pressure medium container, a valve device for controlling the release of high pressure fluid media, comprising a valve body having an inlet passage adapted for securement to a container, an outlet passage, and a valve chamber within said inlet passage; a valve seat facing said valve chamber and formed in said outlet passage; a seat type check valve reciprocally movable in said valve chamber adapted to seat in the direction of the escaping fluid pressure medium; an apertured washer adapted to retain said valve in said valve chamber; means adapted to space said valve with respect to said washer in a position to permit free passage of fluid medium through said washer when one is engaging the other, whereby upon fluid medium being introduced under high pressure through the outlet passage for the purpose of recharging, said valve is adapted to engage said retaining washer and free entry of the fluid medium into the container takes place; a recessed portion on said valve body; a member for unseating said check valve threadedly mounted for reciprocal movement in said recessed portion extending outside said valve body and having a pin portion for operatively engaging said check valve but normally out of contact therewith; and a manually engageable operating member secured to said unseating member.

3. A valve device for controlling the release of high pressure fluid media, comprising a valve body having an inlet passage, an outlet passage, and a valve chamber within said inlet passage; a valve seat facing said valve chamber and formed in said outlet passage; a seat type check valve reciprocally movable in said valve chamber adapted to seat in the direction of the escaping fluid pressure medium; a recessed portion on said valve body; a member for unseating said check valve threadedly mounted for reciprocal movement in said recessed portion extending outside said valve body having shoulders and a pin portion for operatively engaging said check valve normally out of contact therewith; a stop member extending through said recessed portion adapted to be operatively engaged by said shoulders upon upward and downward movement of said unseating member whereby the range of movement of said unseating member is controlled in either direction; and a manually engageable operating member secured to said unseating member.

4. A valve device for controlling the release of high pressure fluid media, comprising a valve body having an inlet passage, an outlet passage, and a valve chamber within said inlet passage; a valve seat facing said valve chamber and formed in said outlet passage; a seat type check valve reciprocally movable in said valve chamber adapted to seat in the direction of the escaping fluid pressure medium; a recessed portion on said valve body in communication with said outlet passage; a member for unseating said check valve threadedly mounted for reciprocal movement in said recessed portion extending outside said valve body and having a pin portion for operatively engaging said check valve normally out of contact therewith; a packing in said recess movable bodily with and with respect to said unseating member; and a manually engageable operating member secured to said unseating member.

5. A valve device for controlling the release of high pressure fluid media, comprising a valve body having an inlet passage, an outlet passage, and a valve chamber within said inlet passage; a valve seat facing said valve chamber and formed in said outlet passage; a seat type check valve reciprocally movable in said valve chamber adapted to seat in the direction of the escaping fluid pressure medium; a member adapted to be engaged to actuate said valve secured thereto; safety fluid pressure release means adjacent said valve chamber in communication with said inlet passage; means in said inlet passage adjacent said valve chamber for retaining said valve in said valve chamber adapted to permit free flow of fluid medium therethrough; a recessed portion on said valve body; a member for unseating said valve threadedly mounted for reciprocal movement in said recessed portion extending outside said valve body and having a pin portion for operatively engaging said member on said valve but normally out of contact therewith; a packing in said recess movable with and with respect to said unseating member; means in said recess adapted to be engaged by said unseating member and thereby to control the range of movement of said unseating member in either direction; and a manually engageable operating member secured to said unseating member.

6. In combination with a container for high pressure fluid medium having an open end, a valve assembly adapted for attachment to said open end for controlling the release of fluid pressure medium from said container comprising a body member having an inlet passage, an outlet passage, a valve chamber within said inlet passage and a recessed portion in axial alignment with said chamber, a valve seat formed in said outlet passage and facing said chamber, a seat type fluid operable check valve reciprocally movable in said valve chamber and adapted to seat under the influence of the fluid pressure medium in said container, a spindle reciprocally mounted in said recess adapted to engage and unseat said valve, means for limiting the travel of said spindle inwardly and outwardly of said recess, a ported disc adapted to be secured intermediate said open end of the container and said body member for limiting the movement of said valve in one direction, and spacing means intermediate said valve and said disc for permitting the passage of fluid through the ported disc when the valve is unseated.

7. In combination with a container having an open end, a valve assembly adapted for attachment to the said open end for controlling the release of high pressure fluid medium from said container comprising a body member having an inlet passage, an outlet passage and a valve chamber within said inlet passage, a valve seat formed in said outlet passage and facing said chamber, a seat type check valve reciprocally movable in said valve chamber and adapted to seat in the direction of escaping fluid pressure medium, a recessed portion in said body member, a valve unseating member mounted for reciprocal movement in said recessed portion and adapted to engage said valve to move the same off said seat, a packing in said recess adapted to be moved bodily axially of said recess in one direction by said unseating member and to be moved in the opposite direction by fluid pressure medium.

8. In combination with a container for high pressure fluid medium having a neck portion at its open end, a valve assembly adapted for attachment to said neck portion for controlling the release of fluid pressure medium from said container comprising a body member having an inlet passage, an outlet passage and a valve chamber within said inlet passage, a valve seat formed in said outlet passage and facing said chamber, a seat type check valve reciprocally movable in said valve chamber and adapted to seat under the influence of fluid escaping from said container, a recessed portion in said body member in axial alignment with said chamber, a spindle mounted for rotary reciprocal movement in said recessed portion and adapted on its inward movement to engage and unseat said valve, a packing in said recess adapted to be moved with said spindle on its inward movement and to be moved in the opposite direction by fluid pressure medium after the return of the spindle to its normal position, and a manually engageable operating member secured to said spindle.

9. In combination with a container for high pressure fluid medium having an open neck portion, a valve assembly adapted for threaded attachment to said neck portion for controlling the release of fluid pressure medium from said container comprising a body member having an inlet passage, an outlet passage, a valve chamber within said inlet passage and a recessed portion in axial alignment with said chamber, a valve seat formed in said outlet passage and facing said chamber, a seat type check valve reciprocally movable in said valve chamber and adapted to seat in the direction of escaping fluid, a spindle reciprocally movable in said recess normally out of contact with said valve and adapted on its movement inwardly of said recess to engage and unseat said valve, means for limiting the movement of said spindle inwardly and outwardly of said recess, a packing in said recess adapted to be moved with said spindle on its inward stroke and to be moved in the opposite direction by fluid pressure medium after the return of said spindle to its normal position, an apertured disc adapted to be fixedly secured intermediate the neck portion of the container and said body member for limiting the movement of said valve toward the container, and spacing means interposed between said valve and disc to permit of the flow of fluid through the apertures in said disc.

10. A valve device for controlling the release of high pressure fluid media from a container, comprising a body adapted for securement to the container and having an inlet passage, an outlet passage, a valve chamber within said inlet passage and a bore in axial alignment with said chamber; a valve seat facing said valve chamber formed in said outlet passage; a seat type check valve reciprocally movable in said valve chamber and adapted to seat in the direction of the escaping fluid pressure medium; an apertured disc disposed in said inlet passage and adapted to retain said valve in said valve chamber; a spindle threadedly mounted for reciprocal movement in said bore and extending out of said valve body and having a portion for operatively engaging and unseating said valve; and a manually engageable operating member secured to said spindle.

HARRY C. GRANT, Jr.